(12) United States Patent
Tian et al.

(10) Patent No.: US 12,327,184 B2
(45) Date of Patent: Jun. 10, 2025

(54) CONTINUAL LEARNING USING CROSS CONNECTIONS

(71) Applicant: INTERNATIONAL BUSINESS MACHINES CORPORATION, Armonk, NY (US)

(72) Inventors: Yu Tian, Piscataway, NJ (US); Xiaolong Wang, Campbell, CA (US); Qinghan Xue, Sunnyvale, CA (US); Steven Nicholas Eliuk, San Jose, CA (US); Xin Guo, Newark, DE (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 16/923,196

(22) Filed: Jul. 8, 2020

(65) Prior Publication Data
US 2022/0012583 A1    Jan. 13, 2022

(51) Int. Cl.
*G06N 3/08*      (2023.01)
*G06N 3/04*      (2023.01)

(52) U.S. Cl.
CPC ............... *G06N 3/08* (2013.01); *G06N 3/04* (2013.01)

(58) Field of Classification Search
CPC .............. G06N 3/08; G06N 3/04; G06N 3/02; G06N 3/06; G06N 7/00; G06N 3/082;
(Continued)

(56) References Cited

U.S. PATENT DOCUMENTS 9,338,622 B2    5/2016    Bjontegard
10,275,714 B2    4/2019    Baker et al.
(Continued)

FOREIGN PATENT DOCUMENTS

CN    108307435 A    7/2018
JP    2016-024812 A    2/2016

OTHER PUBLICATIONS

F. Xiong et al., "Guided Policy Search for Sequential Multitask Learning," in IEEE Transactions on Systems, Man, and Cybernetics: Systems, vol. 49, No. 1, pp. 216-226, Jan. 2019, doi: 10.1109/TSMC.2018.2800040. (Year: 2018).*
(Continued)

*Primary Examiner* — Ashish Thomas
*Assistant Examiner* — Adam C Standke
(74) *Attorney, Agent, or Firm* — Michael O'Keefe

(57) ABSTRACT

A method, a computer system, and a computer program product for using distinct paths with cross connections for distinct tasks to prevent catastrophic forgetting in class-incremental scenarios. Embodiments of the present invention may include receiving one or more tasks sequentially. Embodiments of the present invention may include applying one or more shareable blocks to the one or more tasks. Embodiments of the present invention may include learning one or more distinct paths for the one or more tasks. Embodiments of the present invention may include adding one or more cross connections between the one or more tasks. Embodiments of the present invention may include adding an aggregation block to collect one or more outputs from the distinct paths of each of the one or more tasks. Embodiments of the present invention may include providing a prediction.

24 Claims, 6 Drawing Sheets

(58) Field of Classification Search
CPC ........ G06N 3/084; G06N 3/088; G06F 17/16; G06T 1/00; G06T 7/00; G06T 9/00; G06T 2207/00
See application file for complete search history.

(56) References Cited

U.S. PATENT DOCUMENTS

| | | | |
|---|---|---|---|
| 10,313,755 | B2 | 6/2019 | Kimble et al. |
| 11,030,529 | B2* | 6/2021 | Liang ..................... G06N 3/045 |
| 2013/0282627 | A1* | 10/2013 | Faddoul ................ H04L 51/212 706/12 |
| 2016/0155049 | A1* | 6/2016 | Choi ..................... G06N 3/082 706/16 |
| 2019/0065944 | A1 | 2/2019 | Hotson et al. |
| 2020/0175362 | A1 | 6/2020 | Zhang et al. |

OTHER PUBLICATIONS

Guo et al. "Spottune: transfer learning through adaptive fine-tuning." Proceedings of the IEEE/CVF conference on computer vision and pattern recognition. (Year: 2019).*

Ma, Jiaqi, et al. "Modeling task relationships in multi-task learning with multi-gate mixture-of-experts." Proceedings of the 24th ACM SIGKDD international conference on knowledge discovery & data mining. (Year: 2018).*

Guo, Yunhui, et al. "Spottune: transfer learning through adaptive fine-tuning." Proceedings of the IEEE/CVF conference on computer vision and pattern recognition. (Year: 2019).*

Kawakami, Rei, et al. "Cross-connected networks for multi-task learning of detection and segmentation." 2019 IEEE International Conference on Image Processing (ICIP). IEEE (Year: 2019).*

He, Kai ming, et al. "Deep residual learning for image recognition." Proceedings of the IEEE conference on computer vision and pattern recognition. (Year: 2016).*

Sun, X., Panda, R., Feris, R., and Saenko, K., "AdaShare: Learning What To Share For Efficient Deep Multi-Task Learning", <i> arXiv e-prints</i>, 2019. doi: 10.48550/arXiv. 1911.12423 (Year: 2019).*

F. Xiong et al., "Guided Policy Search for Sequential Multitask Learning," in IEEE Transactions on Systems, Man, and Cybernetics: Systems, vol. 49, No. 1, pp. 216-226, Jan. 2019, doi: 10.1109/TSMC.2018.2800040 (Year: 2019).*

Disclosed Anonymously, "Automatically Scaling Multi-Tenant Machine Learning", An IP.com Prior Art Database Technical Disclosure, IP.com No. IPCOM000252098D, IP.com Electronic Publication Date: Dec. 15, 2017, 35 pages.

Disclosed Anonymously, "Determining Priority Value of Processes Based on Usage History", An IP.com Prior Art Database Technical Disclosure, IP.com No. IPCOM000252344D, IP.com Electronic Publication Date: Jan. 5, 2018, 39 pages.

Disclosed Anonymously, "Ranking and Automatic Selection of Machine Learning Models", An IP.com Prior Art Database Technical Disclosure, IP.com No. IPCOM000252275D, IP.com Electronic Publication Date: Jan. 3, 2018, 34 pages.

Janus, "Becoming a Knowledge-Sharing Organization", A Handbook for Scaling Up Solutions through Knowledge Capturing and Sharing, World Bank Group, © 2016 International Bank for Reconstruction and Development / The World Bank, 203 pages.

Wang et al., "Multi-Task Feature Learning for Knowledge Graph Enhanced Recommendation", arXiv:1901.08907v1 [cs.IR] Jan. 23, 2019, WWW 2019, May 13-17, 2019, San Francisco, USA, 2019. ACM, 11 pages.

Water Supply Division, "Establishing and Managing an Effective Cross-Connection Control Program", TCEQ, Revised Aug. 2016, RG-478, Texas Commission on Environmental Quality, 61 pages.

Mell et al., "The NIST Definition of Cloud Computing", Recommendations of the National Institute of Standards and Technology, Special Publication 800-145, Sep. 2011, 7 pages.

International Search Report and Written Opinion of International Application No. PCT/IB2021/055392, mailed Sep. 28, 2021, 10 pages.

Sun et al., "AdaShare: Learning What To Share For Efficient Deep Multi-Task Learning," arXiv:1911.12423v2 [cs.CV] Nov. 18, 2020, https://arxiv.org/pdf/1911.12423.pdf, 19 pages.

Xiong et al., "Guided Policy Search for Sequential Multitask Learning," IEEE Transactions on Systems, Man, and Cybernetics: Systems, vol. 49, No. 1, Jan. 2019, pp. 216-226.

Tian et al., "Continual Learning Using Cross Connections," International Application No. PCT/IB2021/055392, 31 pages.

Japan Patent Office, "Notice of Reasons for Refusal," Nov. 19, 2024, 5 Pages, JP Application No. 2023-500057.

* cited by examiner

CONTINUAL LEARNING USING CROSS CONNECTIONS

BACKGROUND

The present invention relates generally to the field of computing, and more particularly to machine learning. Deep learning models are used in many domains and can be viewed as a black box with regards to understanding model behavior. Various training models may process data and provide different results with varying accuracy. Producing intelligible results and accurate classifications advance the field of machine learning by providing refined and unbiased output data to be used in various domains and industries.

BRIEF SUMMARY

An embodiment of the present invention may include a method, computer system, and computer program product for using distinct paths with cross connections for distinct tasks to prevent catastrophic forgetting in class-incremental scenarios. Embodiments of the present invention may include receiving one or more tasks sequentially. Embodiments of the present invention may include applying one or more shareable blocks to the one or more tasks. Embodiments of the present invention may include learning one or more distinct paths for the one or more tasks. Embodiments of the present invention may include adding one or more cross connections between the one or more tasks. Embodiments of the present invention may include adding an aggregation block to collect one or more outputs from the distinct paths of each of the one or more tasks. Embodiments of the present invention may include providing a prediction.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
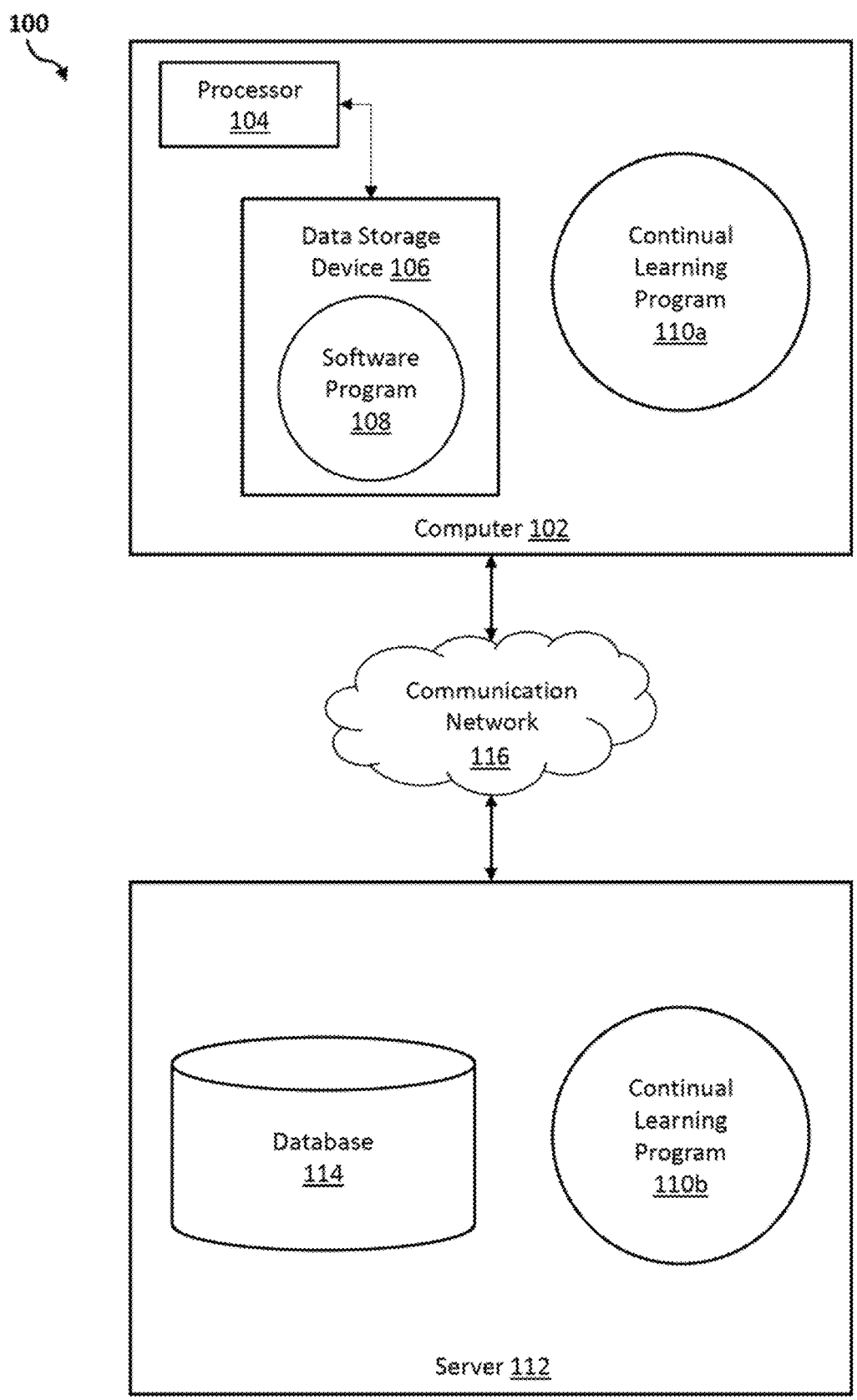
FIG. 1 illustrates a networked computer environment according to at least one embodiment.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate generally to machine learning. More particularly, embodiments of the present invention provide a method, computer program, and computer system for using a continual learning model to learn unique paths with cross connections for distinct tasks to prevent catastrophic forgetting in class-incremental scenarios.

Deep learning is a type of machine learning that may understand and classify information based on the training data. The training data may be structured data or unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. Deep learning may also be related to or known as hierarchical learning or deep structured learning.

Deep learning may map an input, classify data, interpret datasets and provide an output of data for one or more layers of the neural network. Each layer of neural network may be represented as a node. A node may also be known as a neuron or an artificial neuron. Deep learning may detect similarities in data that may or may not be labeled. For example, deep learning may operate as supervised learning, unsupervised learning or semi-supervised learning. Supervised learning may use a labeled dataset to train a ML model. Unsupervised learning may use all unlabeled data to train a ML model. Semi-supervised learning may use both labeled datasets and unlabeled datasets to train a ML model. The deep learning models may provide, for example, a graph output that may be generated as nodes and edges relating to the domain specific taxonomy that is being learned.

A neural network may be a component of deep learning. A neural network may be related to or known as a deep network or a deep neural network. A neural network may interpret, label and classify raw data, such as unstructured data. A neuron in a deep neural network may combine input data and assign a weight to the input data based on a significance level of what the neural network is learning in order to classify the data. That is, the more weight is assigned to the neuron, the more important that neuron is. Further, the deeper the neural network, the more neurons or node layers the input data passes through. A neuron, a node and a filter may be considered interchangeable terms. The neuron may represent the location that receives input data, produces and associates an input weight to the data and then determines, via a computation, if the data should continue or progress further in the network before the data is classified. Each layer of neurons may train the data based on the previous output layer.

Deep learning models may collect and analyze large amounts of data that span various domains and may be used to solve real-world issues. However, deep learning models have their limitations and drawbacks, such as, for example, catastrophic forgetting. Catastrophic forgetting refers to an abrupt knowledge loss or an even complete overwrite on the old knowledge. Catastrophic forgetting is a phenomenon that occurs when old knowledge is not preserved. Old knowledge may relate to the knowledge of a previous task. This old knowledge may be lost when information pertaining to a new task is being learned. As a result, catastrophic forgetting is problematic in continual learning.

One solution to avoid catastrophic forgetting in deep learning models is to store all the training data of all tasks and replay them along with the new streaming data in an arbitrary order. However, this approach is problematic in real world because of the vast amount of data that would have to be analyzed within the constraints of the artificial system's memory budget.

Other solutions to the problem of catastrophic forgetting may include using two models, the task-incremental model and the class-incremental model. Both the task-incremental model and the class-incremental model may mimic real-world scenarios in the continual learning area. In order for these models to work, they may need to learn a number of isolated tasks incrementally without forgetting how to solve previous ones. In order for the task-incremental model to work, it may require the use of different task classifiers or one classifier with multiple heads. As such, when a new test sample is introduced in during the reference stage, the task label of the input data may also be required for the task-incremental model to either choose a task classifier or choose one head to do the prediction.

Class-incremental model differs from the task-incremental model because the class-incremental model does not require task labels in order to work. However, even without task labels, the use of class-incremental model may be problematic. Current methods of using the class-incremental model do not take into consideration the connections between tasks. For example, these methods may not take into consideration connections between tasks that had been previously learned and tasks that are currently being learned. As such, utilizing the class-incremental model to learn a number of isolated tasks incrementally without forgetting how to solve previous tasks poses a challenge.

Therefore, it may be advantageous to, among other things, generate a realistic continual learning model that may be able to prevent catastrophic forgetting on nonstationary distributed streaming data with restricted computational and memory cost by learning unique paths with cross connections for distinct tasks in the class-incremental model. It may also be advantageous to consider connections between tasks by either treating individual tasks separately, or using previous tasks as teacher models or feature extractors to new tasks.

The following described exemplary embodiments provide a system, method and program product for deep learning. As such, embodiments of the present invention have the capacity to improve the technical field of deep learning by utilizing previous tasks as teacher models or feature extractors to new tasks. Further, embodiments of the present invention propose sharing the complementary information from the new tasks to help alleviate catastrophic forgetting of the previous tasks.

Embodiments of the present invention provide a Disjointing and Sharing Past Net (DSPN) model. In an embodiment, the DSPN model may include three components. The components may also be referred to as blocks. The DSPN model may include an aggregation block that may make tasks label-free during the testing phase. The aggregation block may also help with information sharing among different tasks. The DSPN may include a component that may add cross connections between distinct tasks. The DSPN model may utilize cross connections between previous tasks and new tasks to better preserve previous knowledge while learning new tasks. The DSPN model may include a task-oriented path component that may prevent catastrophic forgetting. The DSPN model may provide a way to learn distinct paths for each task. The distinct paths for each task may be unique to that particular task. The DSPN model may also share a distinct path of a previous task with a current task in the lower layers and diversify a path for each task in the higher layers.

A deep neural network may include one or more blocks. Each block may contain one or more network layers. Typically, shareable blocks may be bottom layers of a deep neural network that are shared among different tasks. This may be possible because, in a deep neural network architecture, the bottom layers may extract general features whereas the upper layers extract task specific features. As such, the bottom layers may be reused from previous paths. In an embodiment, the DSPN model may reuse the bottom layers from previous tasks during both the training and the testing stages. In an embodiment, the bottom layers of the DSPN model may be referred to as shareable blocks.

According to an embodiment, the DSPN model may create distinct paths for each task. Each task may include one or more samples. During the training stage, the DSPN model may be trained by received tasks sequentially. The DSPN model may also receive labels for all samples in each task. In an embodiment, a task may include a plurality of samples. In an alternative embodiment, a task may include one sample. For example, the DSPN model may receive task 1. The DSPN model may be tasked to correctly classify an animal that appears in a picture. Task 1 may have two training samples, such as, for example, a dog and a cat sample. Along with the pictures of the animals, the DSPN model may also receive two labels, a dog label and a cat label. In another example, task 1 may include one sample. As such, along with the picture, the DSNP model may receive a label associated with the picture. In both examples, when training on task 1, the DSPN model may create a distinct path for task 1. When a subsequent task, such as, for example, task 2 is inputted into the DSPN model, the DSPN model may create a distinct path for task 2. For a distinct path of a task, each neuron on the distinct path may have different associated weights.

For each subsequent task, the DSPN model may freeze previously learned paths of the previous tasks and only update the neurons lying on the given task's path. For example, when the DSPN model creates a distinct path for task 2, the distinct path of task 1 is frozen. In an embodiment, in order to freeze the path of the previous task, the DSPN model may set parameters at each neuron of the previous task's path as untrainable. As such, during the training stage, when the DSPN model receives the next task, the DSPN model creates a distinct path for that next task but does not change the neuron weights of the previous path. Further, the DSPN model does not change the previous path's neurons and their associated parameters. This may be accomplished by assuming that each neuron on the distinct path has a unique weight that is associated with that neuron. Further, during the training stage, the DSPN model may train neurons that are flagged as trainable but may not train neurons that are flagged as untrainable. Thus, when the DSPN model finds a neuron that is flagged as untrainable, the DSPN model may not change the weight of that neuron because that neuron is frozen. For example, during the training stage, the DSPN model may receive task 1 and create a distinct path for task 1. The DSPN model may freeze the neurons on that path by setting those neuron weights as untrainable. When the DSPN model receives task 2, the DSPN model creates a distinct path for task 2 but does not change the weight of the neurons of the distinct path of task 1 because these neurons are flagged as untrainable. The neurons on the distinct path of task 1 are not trained because their weights are fixed.

A distinct path for each task may also help knowledge preservation across multiple tasks. For example, task 1 may include a classification task to distinguish whether an image is a cat or a dog. Task 2 may include a classification task to distinguish whether an image is an apple or an orange. The images for tasks 1 and 2 are different since a training image for task 1 depicts an animal and the training image for the second task depicts a fruit. If the distinct path of task 1 is not frozen, then when the DSPN model trains with task 2, the training with task 2 may have an effect on the prediction on task 1. However, by freezing the distinct path of task 1, the distinct path of task 1 may be used to predict task 2. The path of task 1 may be used to distinguish task 1 from task 2.

In an embodiment, the DSPN model may allow adding cross connections between tasks. Cross connections may refer to connections between two or more tasks from one layer to another layer. Cross connections may be categorized as forward connections and backward connections. Forward connections may help current and new tasks to learn more efficiently based on the knowledge of previous tasks. Forward connections may be established from previous tasks to the current and new tasks. Backward connections may help previous tasks to preserve their knowledge by utilizing complemental information from the current and new tasks. Backward connections may be established from the current and new tasks to the previous tasks.

Utilizing cross connections between previous tasks and current or new tasks may encourage complementary information sharing among different tasks. This may allow the DSPN model to better preserve previous knowledge while learning new tasks. For example, task 1 may be a classification between a dog and a cat. Task 2 may be a classification between a tiger and a lion. When the DSPN model trains on task 1, the DSPN model acquires information that pertains to the features of the cat and the dog and distinguishes between these features. When the DSPN model trains on task 2, information from task 1 may help the DSPN model to classify task 2. Specifically, the DSPN model may reuse some of the features that it learned from task 1, such as, for example, facial features learned about the cat that may be used to classify the lion. The DSPN model may directly adopt the information learned from task 1 and its path to train task 2.

In another example, task 1 and task 2 are not similar. That is, task 1 may include a classification task to distinguish whether an image is a cat or a dog. Task 2 may include a classification task to distinguish whether an image is an apple or an orange. When the DSPN model trains on task 2, the DSPN model may utilize the information it gained from training on task 1. As such, the DSPN model may utilize the cross connections between task 1 and task 2 to distinguish task 2 from task 1

In addition to utilizing cross connections between tasks, an aggregation block may be added to the DSPN model. The aggregation bock may aggregate all information from different tasks, such as, for example, previous tasks and current tasks. For example, all paths may go through the aggregation block during the training stage and the testing stage. During the training stage, the DSPN model may receive tasks with their corresponding labels for each sample in the task. For each task, the DSPN model may learn its distinct path. The aggregation block may collect the outputs from each task's path. These outputs may be used during the testing and subsequent usage of the DSPN model. These outputs may be shared among subsequent tasks. As a result, during the testing stage, the DSPN model does not require additional task label information.

In an embodiment, the aggregation block may be added before the final layer of the network. Utilizing the aggregation block may allow the DSPN model to better aggregate information from different tasks and enable the network to predict class labels directly without requiring task labels as inputs.

Referring to FIG. 1, an exemplary networked computer environment 100 is depicted, in accordance with an embodiment. The networked computer environment 100 may include a computer 102 with a processor 104 and a data storage device 106 that is enabled to run a software program 108 and a continual learning program 110*a*. The networked computer environment 100 may also include a server 112 that is enabled to run a continual learning program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the continual learning program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the continual learning program 110a, 110b (respectively) to build the DSPN model that may learn unique paths with cross connections for distinct tasks in a class-incremental scenario. The deep learning method is explained in more detail below with respect to FIGS. 2-3.

Figure 2:
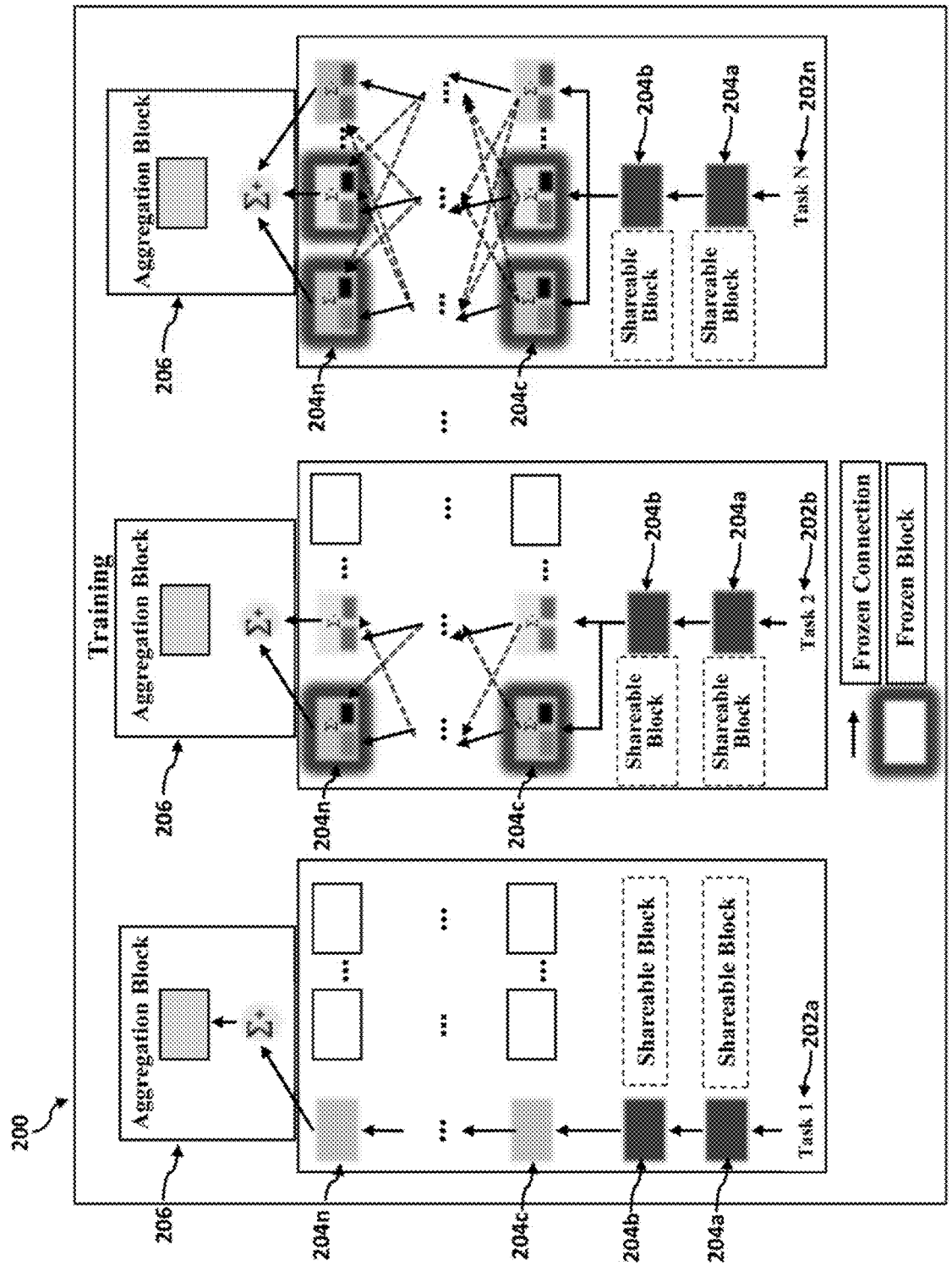
FIG. 2 is a block diagram example of sequentially learning tasks through task-oriented paths, in accordance with an embodiment of the invention.

Referring to FIG. 2, a block diagram example of a training environment 200 is depicted, in accordance with an embodiment. In an embodiment, the continual learning program 110a, 110b may utilize the DSPN model to sequentially learn tasks through task-oriented paths. The continual learning program 110a, 110b may learn many tasks 202a-n. Tasks 202a-n may include, but are not limited to, computer vision, speech recognition, machine translation, social network filtering, playing board and video games, or medical diagnosis. As illustrated, each task 202a-n may have its own path that the task 202a-n goes through during the testing and inference stages.

The training environment 200 of the DSPN model may have multiple layers 204a-n. Each layer 204a-n may have multiple neurons or nodes. The layers 204a-n may be various types of layers, such as convolutional, pooling, Relu, liner or fully connected. The layers 204a-n may also be referred to as bottom layers and upper layers. For example, layers 204a, 204b may be referred to as bottom layers whereas layers 204c-n may be referred to as upper layers. Bottom layers may extract general task features whereas the upper layers may extract task specific features. As such, bottom layers may also be referred to as shareable bocks because they may be reused from previous tasks and their generated paths when testing or analyzing a new task.

The training environment 200 of the DSPN model may also have an aggregation block 206. The aggregation block 206 may aggregate information of all paths. The aggregation block 206 may help with information sharing among various tasks 202a-n.

As is illustrated in FIG. 2, the training environment 200 of the DSN model may also freeze connections of tasks 202a-n that were previously performed before moving on to another task. For example, the continual learning program 110a, 110b may utilize the DSPN model to learn multiple tasks. Starting with task 1, during the training stage, the path of task 1 may be designated and parameters associated with the path may be determined. When switching to a second task, task 2, the DSPN model may freeze the parameters of the distinct path for task 1 and then create a new path for task 2. It should be appreciated that the DSPN model does not freeze the path of task 1 at the lower layers. That is, the shareable blocks are not frozen. Rather, the shareable blocks are used by subsequent tasks both during the training and testing stages.

The DSPN model may also enable forward and backward connections between old and new tasks. For example, once the DSPN model creates a path for task 1, the DSPN model may then move onto task 2. Initially, the bottom layers of task 1 may be shared with task 2. In the upper layers, forward connections may be added between task 1 and task 2 to help task 2 learn more efficiently based on task 1. In addition, backward connection may be added from task 2 to task 1 to help task 1 preserve knowledge by utilizing the complementary information from task 2.

Figure 3:
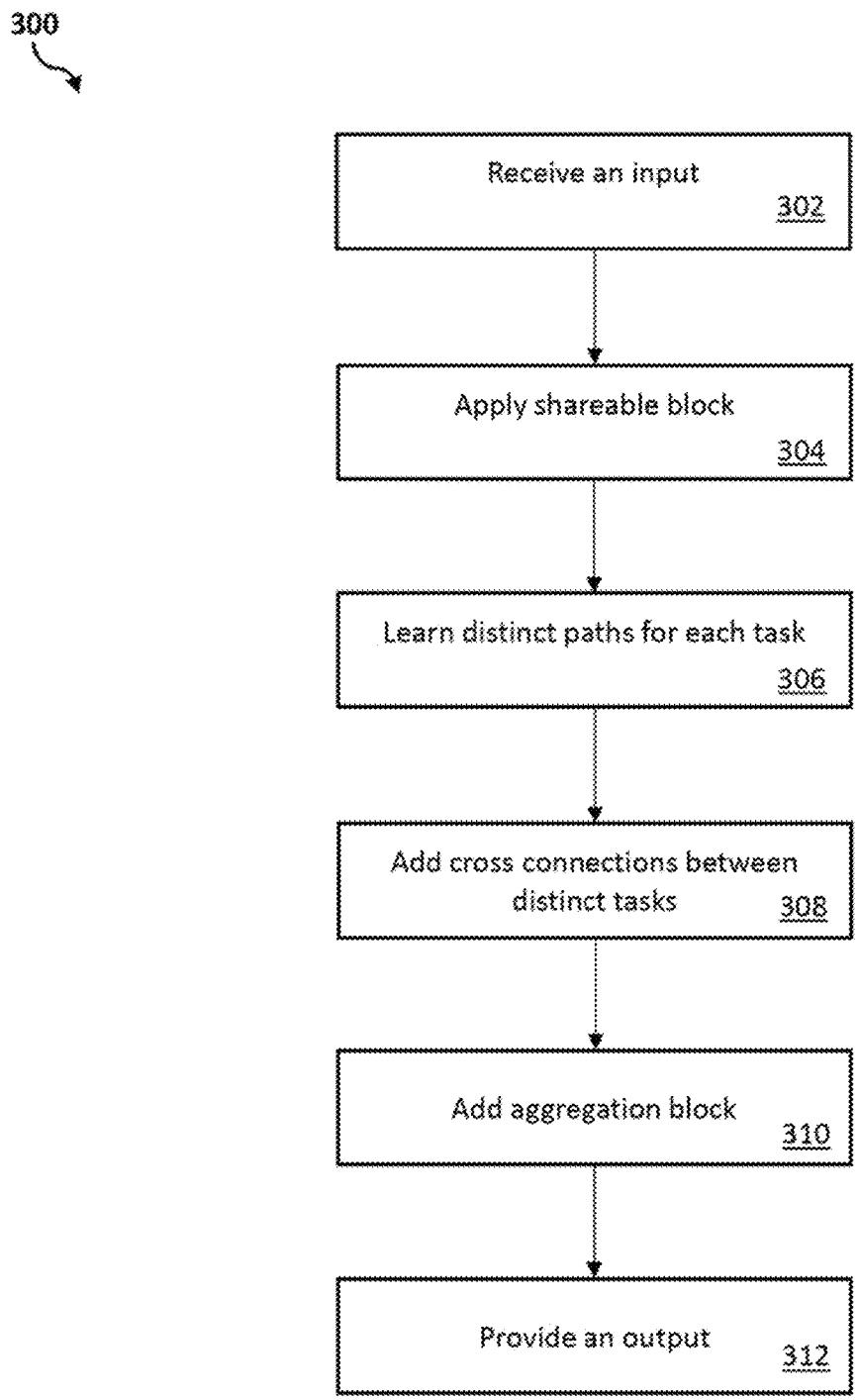
FIG. 3 is a flow chart illustrating a process for using a continual learning model to learn unique paths with cross connections for distinct tasks to prevent catastrophic forgetting in class-incremental scenarios, in accordance with an embodiment of the invention.

Referring now to FIG. 3, an operational flow chart 300 according to at least one embodiment is depicted. The operational flow chart 300 illustrates the training of an exemplary DSPN model. The DSPN model may be used by the continual learning program 110a, 110b to prevent catastrophic forgetting in a deep neural network.

As described above, class-incremental learning aims to keep learning new tasks sequentially from the streaming data. Each task may include a single class or an asset of different categories. Continually learning new knowledge while preserving previous tasks' performance is the key objective of class-incremental learning. To achieve this goal, embodiments of the present invention propose the DSPN model that may create distinct paths for different tasks. A distinct path for each task may help preserve knowledge across multiple tasks. In an embodiment, the DSPN model may also utilize an aggregation block and cross connections between tasks to preserve previous tasks' performance.

At operation 302, an input is received. The input may be in the form of tasks 202a-n. The input may also include training data, both structured and unstructured data. For example, data may include images and documents stored on one or more databases. Public databases may be used, and private databases may be used with proper access. For example, training data samples may include various animal species obtained from public databased to train a model. A private database example may include images and documents used from a hospital repository to train a model relating to medical images or medical diagnoses. Another private database example may include images and documents from other industries, such as finance, legal, agriculture, automotive or government.

At operation 304, shareable blocks are applied. In a deep neural network architecture, bottom layers may extract general features whereas the upper layers may extract task specific features. As such, bottom layers may be shared among all tasks. In an embodiment, the DSPN may have bottom layers that may be referred to as shareable blocks. For example, in an embodiment, after finishing the first tasks training with path $P_1$, all of the following tasks may reuse s blocks of path $P_1$:

$$P_k = \{B_1^{(1)}, \ldots, B_1^{(s)}, B_{k,}^{(s+1)}, \ldots, B_k^{(m)}\} \quad \text{Equation 1}$$

where $P_k$ refers to a path of a task k and B refers to a block.

In an embodiment, there may be one or more shareable blocks that are shared among different tasks, such as, for example, two shareable blocks. In an alternative embodiment, the number of shareable blocks may be three or more. Utilizing shareable blocks among different tasks may greatly reduce the number of parameters for the first s blocks.

At operation 306, distinct paths for each task are learned. Learning a distinct path for each task may help in the preservation of knowledge across multiple tasks thus preventing catastrophic forgetting. This may be accomplished by utilizing disjoint paths. Disjoint paths may be distinguished paths that are independent and do not have any connections between each other. For example, assuming that the DSPN model may learn K tasks sequentially. The training data may be represented as:

$X=\{X_1, X_2, \ldots, X_K\}$, where $X_k$ is the training dataset for the $k^{th}$ task.

In an embodiment, task k may include $U_k$ different classes. $U_k$ may also be the same or different among different tasks. When training the first task, the DSPN model may start with a single path $P_1$ consisting of m blocks $\{B_1^{(1)}, B_1^{(2)}, \ldots, B_k^{(m)}\}$, where each block $B_1^{(i)}, \in \{1, 2, \ldots, m\}$ may be a residual block or a multilayer perceptron layer. The residual block may refer to a partial module of an existing pretrained deep learning module that may be used in the DSPN model. The multilayer perceptron layer may be a feedforward artificial neural network that may also be used in the DSPN model.

During the training stage, hidden activations $h_1^{(i)}$ may be obtained sequentially through:

$$h_1^{(i)}=B_1^{(i)}(h_1^{(i-1)}), i \in \{1,2,\ldots,m\} \quad \text{Equation 2}$$

where $h_1^{(0)}$ is the input data sampled from $X_1$.

When switching to the second task, parameters of path $P_1$ may be frozen and a new path $P_2$ with m blocks may be created for data $X_2$. This may be generalized to all K tasks.

A hidden activation may be an output of each task. For example, during training, the DSPN model may be tasked with classifying task 1. The DSPN model learns the distinct path for task 1 and generates an output. The output of the distinct path for task 1 is the hidden activation. The hidden activations of all tasks may be collected in the aggregation block. Further, the more tasks the DSPN model trains on, the more hidden activations are generated.

At operation 308, cross connections between distinct tasks are added. Cross connections may affect the total number of parameters as cross connections are quadratic to the number of tasks. Cross connections may include forward connections and backward connections. A forward connection may include a connection from a previous path to a current path. This may allow the current path to learn how to utilize the weighted prior knowledge from a previous path to improve and accelerate the current path training. A backward connection may include a connection from the current path to a previous path. By applying a backward connection, the performance of the previous task may be enhanced by the knowledge transfer from the path of the current task to the path of the previous task.

In an embodiment, an intermediate forward cross-connection between paths may be applied. Specifically, at task k, with forward connections $C_k^f=\{C_{0,k}^{(i)}, C_{1,k}^{(i)}, \ldots, C_{k-1,k}^{(i)}\}$, $i \in \{1, 2, \ldots, m\}$. As such, the hidden activation $h_k^{(i)}$ is updated by:

$$h_k^{(i)}=B_k^{(i)}(h_k^{(i-1)})+\Sigma_{j<k} C_{j,k}^{(i)}(h_j^{(i-1)}), i \in \{1,2,\ldots,m\} \quad \text{Equation 5}$$

where $h_j^{(i-1)}$ are hidden activations in previous paths, $C_{j,k}^{(i)}$ is a trainable block incorporating prior knowledge of $j^{th}$ task with the current task k.

In an embodiment, an intermediate backward cross-connection between paths may also be applied. Specifically, with the help of backward connections $C_k^b=\{C_{k,0}^{(i)}, C_{k,1}^{(i)}, \ldots, C_{k,k-1}^{(i)}\}$, $i \in \{1, 2, \ldots, m\}$, the current task's information may be utilized to update previous tasks $j<k$ by:

$$h_j^{(i)}=B_j^{(i)}(h_j^{(i-1)})+\Sigma_{t=k} C_{t,j}^{(i)}(h_t^{(i-1)}), i \in \{1,2,\ldots,m\} \quad \text{Equation 6}$$

where for the given task k, $C_{t,j}^{(i)}$ is trainable only when t=k.

In an embodiment, one set of backward and forward connections are allowed. For example, as stated above, when the DSPN model is switching to the second task, parameters of the distinct path $P_1$ may be frozen and a new path $P_2$ with m blocks may be created for data $X_2$. Further, a forward connection from task 1 to task 2 may be applied. In addition, a backward connection from task 2 to task 1 may also be applied. By applying the forward connection from task 1 to task 2, the path k of task 2 may utilize weighted prior knowledge to improve its path training. In addition, when backward connections are applied from task 2 to task 1, the knowledge of task 2 may flow from task 2 to task 1, thus enhancing the performance of task 1. In an alternative embodiment, multiple backward and forward connections are allowed.

At operation 310, the aggregation block 206 is added. In an embodiment, the aggregation block 206 may be added before the final layer of the network to better aggregate information from different tasks. The aggregation block 206 may incorporate all paths' information. The aggregation block 206 may allow for all paths to go through the aggregation block 206, both during the training and the testing stages.

The aggregation block 206 may continually update during the whole training stage, thus allowing for information to be shared among various tasks. In a conventional deep learning model, during the testing stage, an image along with the task id is provided. Once the model receives the task id, the model reads it and determines that the image provided belongs to a particular task, for example, task 1. The model may then make an inference as to what the image represents, based on the task id that was provided and the information associated with that task id.

Embodiments of the present invention provide the DSPN model which may utilize the aggregation block 206 instead of the task id. As such, the DSPN model does not receive a task id. Rather, the aggregation block 206 aggregates all outputs from all tasks that were inputted into the DSPN model. This aggregation of outputs allows for the DSPN model to have outputs, or knowledge, of all previous task paths. Therefore, when the DSPN model receives a new task, the DSPN model, at the aggregation block 206, may load outputs from each previous path to make its prediction. Since the DSPN model does not have a task id, the DSPN model may choose the most relevant task from the aggregated previous tasks to complete its prediction for the new task.

As described above, in addition to the aggregation block 206, the DSPN model may also freeze a path $P_k$ to preserve the knowledge of the $k^{th}$ task. Generally, during the testing stage, since task labels are unknown, the DSPN model does not know which path to select in order to do the inference for a given data sample. Embodiments of the present invention introduce the aggregation block 206 architecture S which aggregates information of all paths. By aggregating the knowledge from K tasks, block S may generate a unique hidden activation $h_K$:

$$h_K=A(h_1^{(m)} \oplus h_2^{(m)} \oplus \ldots \oplus h_k^{(m)}) \quad \text{Equation 3}$$

where $h_i^{(m)}$ is the last hidden activation of path $P_i$ and $\oplus$ denotes the element-wise addition.

During training, when task k is coming, since there are only k paths, block S may be updated by:

$$h_k=A(h_1^{(m)} \oplus h_2^{(m)} \oplus \ldots \oplus h_k^{(m)}) \quad \text{Equation 4}$$

where A is the aggregation block and $h_k$ may have the same dimensions as $h_K$.

In an embodiment, while path $P_k$ is frozen after task k, block S may always be trainable. Having a block that may always be trainable allows for information to be shared between different tasks. Block S make take the hidden activation from all tasks. As such, block S may share the information from the hidden activations among different tasks. This may be done by applying Equation 4.

At operation 312, an output is provided. The DSPN model may provide a prediction of a particular input. For example, the DSPN model is provided an input in the form of a picture of a cat. The DSPN model may also be provided a sample label. In this case, the sample label may indicate that the picture is a "cat." In an embodiment, since task 1 includes only one sample, the DSPN model is provided one sample label. In an alternative embodiment, task 1 may include two samples. As such, the DSPN model may receive two sample labels corresponding to the two samples of task 1.

Once the DSPN model is provided a sample picture with its corresponding sample label, the DSPN model may be tasked to classify the animal in the picture. The output may be a prediction that the picture is a cat. In an embodiment, the output generated by the DSPN model may be compared to the one or more samples for the task to determine whether the output is accurate. However, irrespective of whether the DSPN model is accurate in classifying task 1, another input, such as, for example, task 2 and its corresponding samples and sample labels may be inputted into the DSNP model for further training.

It should be appreciated that during the training stage, the DSPN model may follow the operations illustrated in FIG. 3. However, during the testing stage, the DSPN model is already trained. As such, the operational flow chart of the DSPN model during testing may include two operations: receiving an input and providing an output. For example, the DSPN model may receive a picture and may be tasked with classifying the picture. During testing, the DSPN model does not receive labels, such as for example, sample labels because the DSPN model is already trained. As such, when the DSPN model receives an input, it classifies the input and provides an output.

It should be appreciated that FIGS. 2-3 provide only an illustration of one embodiment and do not imply any limitations with regard to how different embodiments may be implemented. Many modifications to the depicted embodiment(s) may be made based on design and implementation requirements.

Figure 4:
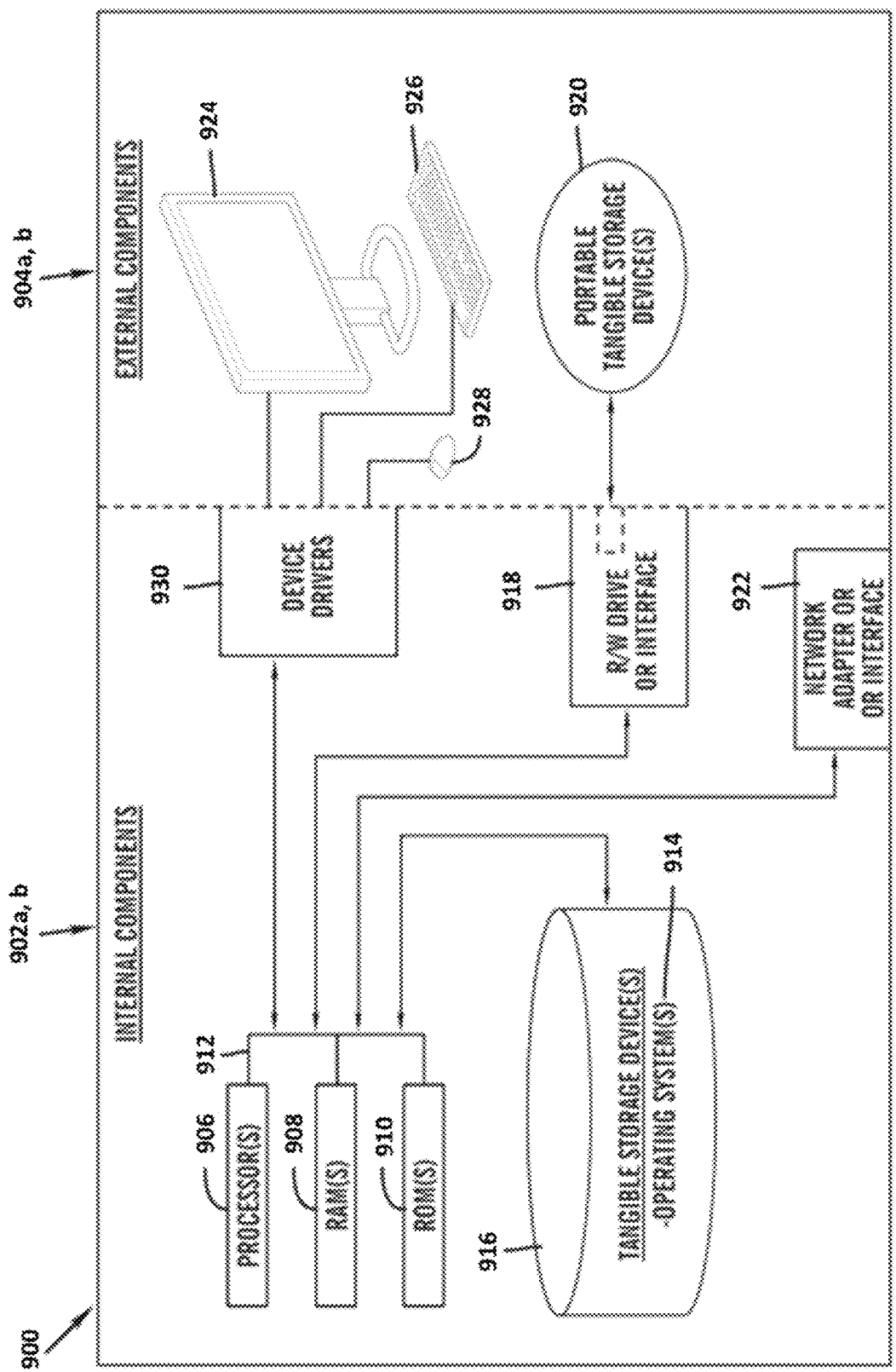
FIG. 4 is a block diagram depicting internal and external components of computers and servers depicted in FIG. 1, in accordance with an embodiment of the invention.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The computers depicted in FIG. 1 may be representative of any electronic device capable of executing machine-readable program instructions. The computers may be representative of a smart phone, a computer system, PDA, or other electronic devices. Examples of computing systems, environments, and/or configurations may include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the continual learning program 110a in client computer 102, and the continual learning program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the continual learning program 110a, 110b can be stored on one or more of the respective portable computer-readable tangible storage devices 920, read via the respective R/W drive or interface 918 and loaded into the respective hard drive.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the continual learning program 110a in client computer 102 and the continual learning program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the continual learning program 110a in client computer 102 and the continual learning program 110b in network server computer 112 are loaded into the respective hard drive. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
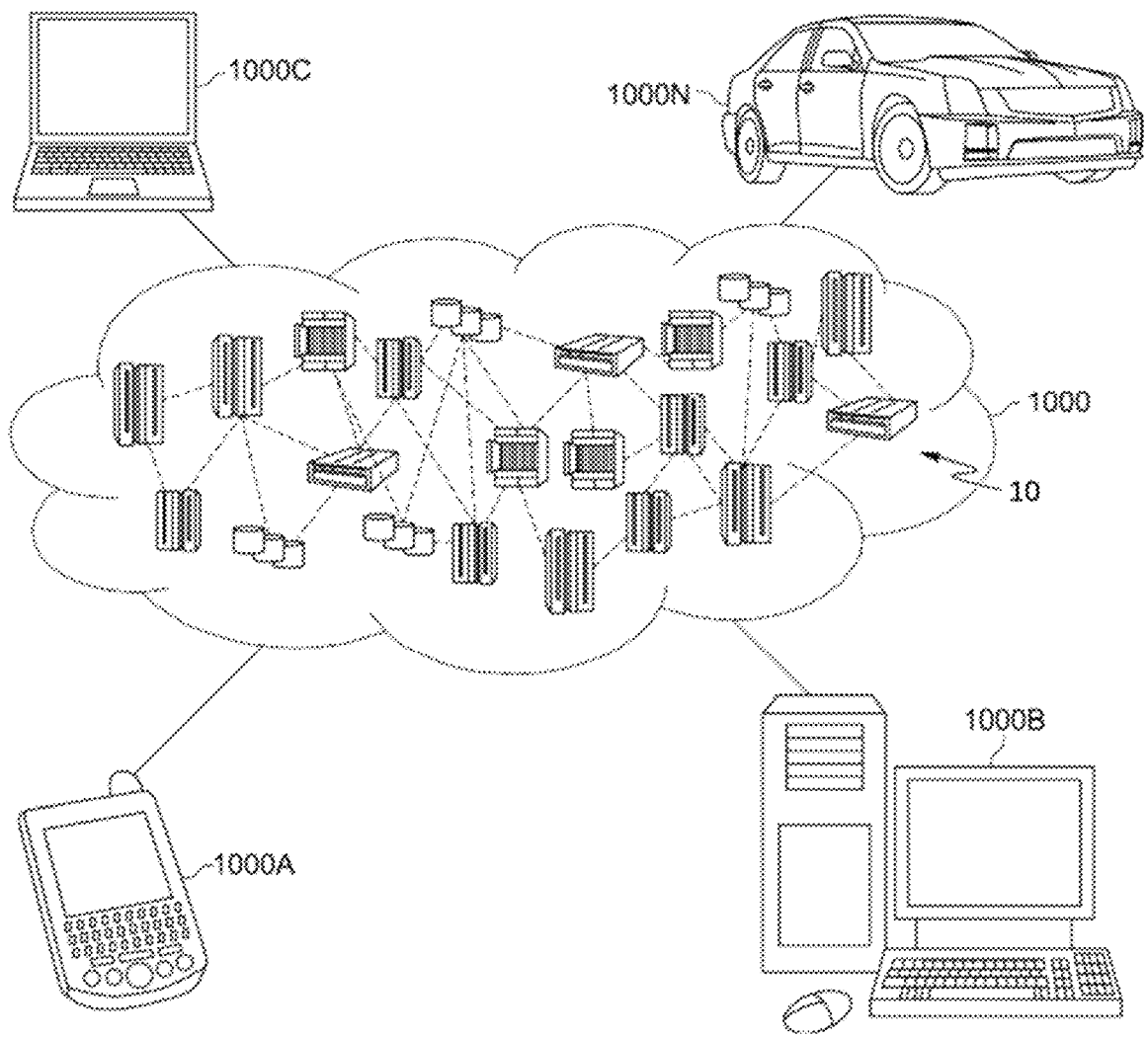
FIG. 5 is a functional block diagram depicting a cloud computing environment including the computer system depicted in FIG. 1, in accordance with an embodiment of the invention.

Referring now to FIG. 5, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 10 and cloud computing environment 1000 can communicate with any type of computerized device over any type of network and/or network addressable connection (e.g., using a web browser).

Figure 6:
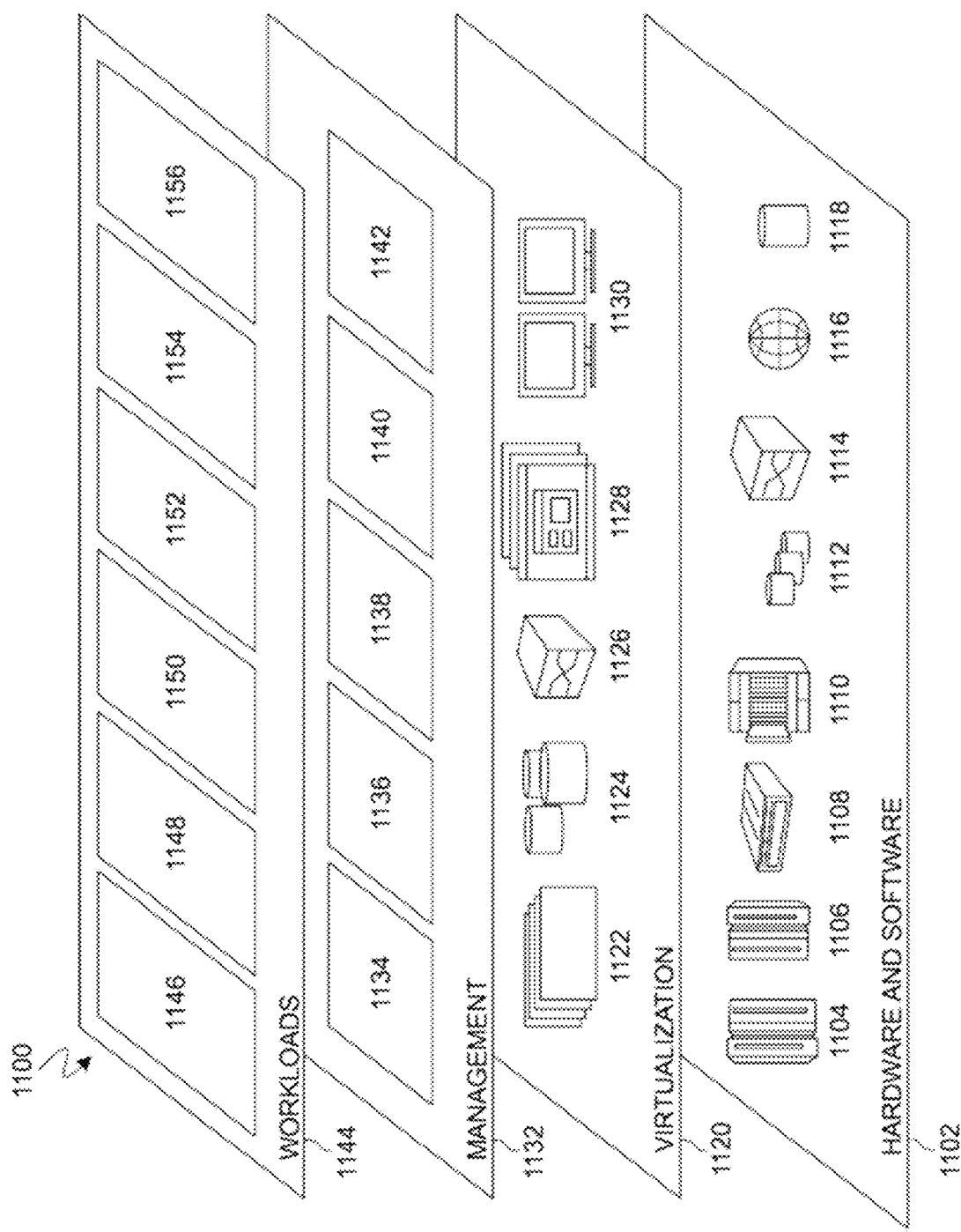
FIG. 6 is a diagram depicting abstraction model layers provided by the cloud computing environment of FIG. 5, in accordance with an embodiment of the invention.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. The continual learning program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving one or more tasks sequentially in a deep neural network architecture;
    applying one or more shareable blocks in a bottom layer of the deep neural network architecture to the one or more tasks;
    freezing one or more neurons of one or more previously learned distinct paths of the one or more tasks, wherein freezing comprises setting a weight associated with one or more parameters of a neuron as untrainable;
    training the deep neural network through:
        identifying one or more distinct paths for the one or more tasks;
        identifying hidden activations, sequentially along the one or more distinct paths, for each task, wherein the hidden activations are outputs of each task and are calculated as $h_1^{(i)} = B_1^{(i)}(h_1^{(i-1)})$, $i \in \{1, 2, \ldots, m\}$ where B is a current block and h is input data sampled from a training dataset;
        creating one or more cross connections between the one or more tasks and one or more previous tasks, and wherein the one or more cross connections are selected from a group consisting of a forward connection from the one or more previous tasks to the one or more tasks and a backward connection from the one or more tasks to the one or more previous tasks; and
        aggregating the outputs from the distinct paths of each of the one or more tasks in an aggregation block; and
    providing a prediction as to a task in the one or more tasks using the trained deep neural network.

2. The method of claim 1, wherein receiving the one or more tasks sequentially further comprises:
    receiving one or more labels of data, wherein the one or more labels of data correspond to the one or more tasks.

3. The method of claim 1, further comprising:
    training one or more neurons of the one or more distinct paths for the one or more tasks, wherein the one or more neurons are set as trainable.

4. The method of claim 3, wherein freezing the one or more neurons of one or more previously learned distinct paths of the one or more tasks further comprises:
    setting the one or more neurons of the one or more previously learned distinct paths as untrainable.

5. The method of claim 1, wherein the one or more distinct paths comprises one or more neurons, wherein the one or more neurons have one or more weights.

6. The method of claim 1, wherein the one or more cross connections between the one or more tasks comprises:
    one or more forward cross connections between the one or more tasks; and
    one or more backward cross connections between the one or more tasks.

7. The method of claim 1, wherein collecting the outputs from the distinct paths of each of the one or more tasks further comprises:
    aggregating, by the aggregation block, one or more hidden activations from the one or more distinct paths of the one or more tasks.

8. The method of claim 1, wherein the aggregation block is added before a final layer of a deep learning network.

9. A computer system, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving one or more tasks sequentially in a deep neural network architecture;
    applying one or more shareable blocks in a bottom layer of the deep neural network architecture to the one or more tasks;
    freezing one or more neurons of one or more previously learned distinct paths of the one or more tasks, wherein freezing comprises setting a weight associated with one or more parameters of a neuron as untrainable;
training the deep neural network through:
  identifying one or more distinct paths for the one or more tasks;
  identifying hidden activations, sequentially along the one or more distinct paths, for each task, wherein the hidden activations are outputs of each task and are calculated as $h_1^{(i)}=B_1^{(i)}(h_1^{(i-1)})$, $i \in \{1, 2, \ldots, m\}$ where B is a current block and h is input data sampled from a training dataset;
  creating one or more cross connections between the one or more tasks and one or more previous tasks, and wherein the one or more cross connections are selected from a group consisting of a forward connection from the one or more previous tasks to the one or more tasks and a backward connection from the one or more tasks to the one or more previous tasks; and
  aggregating the outputs from the distinct paths of each of the one or more tasks in an aggregation block; and
providing a prediction as to a task in the one or more tasks using the trained deep neural network.

10. The computer system of claim 9, wherein receiving the one or more tasks sequentially further comprises:
receiving one or more labels of data, wherein the one or more labels of data correspond to the one or more tasks.

11. The computer system of claim 9, further comprising:
training one or more neurons of the one or more distinct paths for the one or more tasks, wherein the one or more neurons are set as trainable.

12. The computer system of claim 11, wherein freezing the one or more neurons of one or more previously learned distinct paths of the one or more tasks further comprises:
setting the one or more neurons of the one or more previously learned distinct paths as untrainable.

13. The computer system of claim 9, wherein the one or more distinct paths comprises one or more neurons, wherein the one or more neurons have one or more weights.

14. The computer system of claim 9, wherein the one or more cross connections between the one or more tasks comprises:
one or more forward cross connections between the one or more tasks; and
one or more backward cross connections between the one or more tasks.

15. The computer system of claim 9, wherein collecting the outputs from the distinct paths of each of the one or more tasks further comprises:
aggregating, by the aggregation block, one or more hidden activations from the one or more distinct paths of the one or more tasks.

16. The computer system of claim 9, wherein the aggregation block is added before a final layer of a deep learning network.

17. A computer program product, comprising:
one or more computer-readable tangible storage media and program instructions stored on at least one of the one or more computer-readable tangible storage media, the program instructions executable by a processor to cause the processor to perform a method comprising:
  receiving one or more tasks sequentially in a deep neural network architecture;
  applying one or more shareable blocks in a bottom layer of the deep neural network architecture to the one or more tasks;
  freezing one or more neurons of one or more previously learned distinct paths of the one or more tasks, wherein freezing comprises setting a weight associated with one or more parameters of a neuron as untrainable;
  training the deep neural network through:
    identifying one or more distinct paths for the one or more tasks;
    identifying hidden activations, sequentially along the one or more distinct paths, for each task, wherein the hidden activations are outputs of each task and are calculated as $h_1^{(i)}=B_1^{(i)}(h_1^{(i-1)})$, $i \in \{1, 2, \ldots, m\}$ where B is a current block and h is input data sampled from a training dataset;
    creating one or more cross connections between the one or more tasks and one or more previous tasks, and wherein the one or more cross connections are selected from a group consisting of a forward connection from the one or more previous tasks to the one or more tasks and a backward connection from the one or more tasks to the one or more previous tasks; and
    aggregating the outputs from the distinct paths of each of the one or more tasks in an aggregation block; and
  providing a prediction as to a task in the one or more tasks using the trained deep neural network.

18. The computer program product of claim 17, wherein receiving the one or more tasks sequentially further comprises:
receiving one or more labels of data, wherein the one or more labels of data correspond to the one or more tasks.

19. The computer program product of claim 17, further comprising:
training one or more neurons of the one or more distinct paths for the one or more tasks, wherein the one or more neurons are set as trainable.

20. The computer program product of claim 19, wherein freezing the one or more neurons of one or more previously learned distinct paths of the one or more tasks further comprises:
setting the one or more neurons of the one or more previously learned distinct paths as untrainable.

21. The computer program product of claim 17, wherein the one or more distinct paths comprises one or more neurons, wherein the one or more neurons have one or more weights.

22. The computer program product of claim 17, wherein the one or more cross connections between the one or more tasks comprises:
one or more forward cross connections between the one or more tasks; and
one or more backward cross connections between the one or more tasks.

23. The computer program product of claim 17, wherein collecting the outputs from the distinct paths of each of the one or more tasks further comprises:
aggregating, by the aggregation block, one or more hidden activations from the one or more distinct paths of the one or more tasks.

24. The computer program product of claim 17 wherein the aggregation block is added before a final layer of a deep learning network.

* * * * *